United States Patent
Kosaka et al.

(10) Patent No.: US 10,295,419 B2
(45) Date of Patent: May 21, 2019

(54) ACTUATOR

(71) Applicant: TOYOTA JIDOSHA KABUSHIKI KAISHA, Toyota-shi, Aichi-ken (JP)

(72) Inventors: Yusuke Kosaka, Chofu (JP); Yoshihiro Kuroki, Yokohama (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 166 days.

(21) Appl. No.: 15/437,623

(22) Filed: Feb. 21, 2017

(65) Prior Publication Data

US 2017/0241761 A1 Aug. 24, 2017

(30) Foreign Application Priority Data

Feb. 24, 2016 (JP) .................................. 2016-032981
May 25, 2016 (JP) .................................. 2016-104125

(51) Int. Cl.
*B62D 6/10* (2006.01)
*F16D 3/04* (2006.01)
(Continued)

(52) U.S. Cl.
CPC ................. *G01L 3/14* (2013.01); *F16D 3/04* (2013.01); *G01L 5/0019* (2013.01); *B25J 13/085* (2013.01); *B62D 6/10* (2013.01); *B62D 15/0215* (2013.01); *F16D 2300/18* (2013.01); *G01L 3/1457* (2013.01); *G01L 5/161* (2013.01); *G01L 5/226* (2013.01)

(58) Field of Classification Search
CPC ...... B25J 13/085; B62D 6/10; B62D 15/0215; G01L 5/161; G01L 5/0019; G01L 5/226; G01L 3/1457; G01L 3/14; F16D 3/04; F16D 2300/18
See application file for complete search history.

(56) References Cited

U.S. PATENT DOCUMENTS

| 4,613,316 A * | 9/1986 | Reynolds ................. F16D 3/68 464/137 |
| 5,193,401 A * | 3/1993 | Bridges ..................... B25J 3/04 73/862.195 |

(Continued)

FOREIGN PATENT DOCUMENTS

| JP | 04032041 U | 3/1992 |
| JP | 2007-40774 A | 2/2007 |

(Continued)

*Primary Examiner* — Jonathan M Dunlap
(74) *Attorney, Agent, or Firm* — Sughrue Mion, PLLC (57) ABSTRACT

An actuator according to an embodiment includes a first rotating body that is rotatable around an input axis and includes a first groove part extending in a first direction, a second rotating body that is rotatable around an output axis and includes a second protruding part extending in a second direction substantially perpendicular to the first direction, a strain body that includes a first protruding part capable of being engaged with a first groove part through a gap whose direction is vertical to that of the input axis and a second groove part capable of being engaged with a second protruding part through a gap whose direction is vertical to that of the output axis and transmits a rotational torque of the input axis to the output axis, and a detection element that is attached to the strain body.

1 Claim, 12 Drawing Sheets

(51) Int. Cl.
  *G01L 3/14* (2006.01)
  *G01L 5/00* (2006.01)
  *G01L 5/16* (2006.01)
  *G01L 5/22* (2006.01)
  *B25J 13/08* (2006.01)
  *B62D 15/02* (2006.01)

(56) References Cited

U.S. PATENT DOCUMENTS

| | | | | |
|---|---|---|---|---|
| 6,694,828 | B1* | 2/2004 | Nicot | B62D 1/16 |
| | | | | 180/422 |
| 7,028,540 | B2* | 4/2006 | Morikawa | G01L 5/161 |
| | | | | 73/146 |
| 7,174,794 | B2* | 2/2007 | Sugiyama | B62D 6/10 |
| | | | | 73/856 |
| 8,291,775 | B2* | 10/2012 | Nagasaka | G01L 3/1457 |
| | | | | 73/862.041 |
| 2005/0188756 | A1* | 9/2005 | Morikawa | G01L 5/161 |
| | | | | 73/146 |
| 2011/0239788 | A1 | 10/2011 | Nagasaka et al. | |

FOREIGN PATENT DOCUMENTS

| JP | 2011-209099 A | 10/2011 |
|---|---|---|
| JP | 2013-61305 A | 4/2013 |

* cited by examiner

ACTUATOR

CROSS-REFERENCE TO RELATED APPLICATIONS

This application is based upon and claims the benefit of priority from Japanese patent application No. 2016-32981, filed on Feb. 24, 2016, and Japanese patent application No. 2016-104125, filed on May 25, 2016, the disclosure of which is incorporated herein in its entirety by reference.

TECHNICAL FIELD

The present invention relates to an actuator that includes a torque sensor.

BACKGROUND

Typically, a torque sensor is applied to an actuator that controls a rotary drive system. The torque sensor is attached to a rotating body that is supported by a bearing and includes a strain part to be strained due to a torsion moment. By measuring the distortion of the strain part, torque of the rotating body is detected. In order to achieve a high-accuracy control, it is required to accurately measure the torque. Various techniques therefor have been developed.

Japanese Unexamined Patent Application Publication No. 2011-209099 discloses a torque sensor that has a structure in which a first rotating body (an inner ring) and a second rotating body (an outer ring) formed of a pair of concentric annular bodies having diameters different from each other are divided from each other, the torque sensor transmitting torque from the inner ring to the outer ring through strain bodies. The strain bodies are integrally formed with the inner ring and are shaft portions (beams) protruding from the outer peripheral part of the inner ring to the inner peripheral part of the outer ring.

The strain bodies are relatively movable relative to the outer ring in the axial direction, the radial direction, and the rotational direction and include engaging parts capable of being engaged in the rotational direction. In the torque sensor, the strain body has a predetermined amount of freedom in the aforementioned three directions, whereby it becomes possible to reduce influences of vibrations occurring in the rotating body and to detect torque with high accuracy.

Japanese Unexamined Patent Application Publication No. 2013-061305 discloses a torque sensor that measures torque transmitted from a primary-side fastening member (an input side) to a secondary-side fastening member (an output side). This torque sensor includes a first structure body that is coupled to the primary-side fastening member, a second structure body that is coupled to the secondary-side fastening member, a strain part that couples the first structure body to the second structure body, and a strain sensor capable of detecting an amount of deformation of the strain part. The first structure body is coupled to the primary-side fastening member by bolted connection. The first structure body and the primary-side fastening member are fitted to each other while having clearance smaller than that of the bolted connection in a torque acting direction (circumferential direction) which is a direction in which the torque acts, by combining a protruding part and a groove part that accommodates the protruding part.

Japanese Unexamined Patent Application Publication No. 2007-040774 discloses a torque sensor in which a load member that receives loads and a torque member that receives torque are constituted independently from each other. The second moment of area of the torque member is made maximum in the direction of rotation (minimum in the direction along the axial center) and the second moment of area of the load member is made maximum in the direction along the axial center (minimum in the direction of rotation), whereby it is possible to detect torque with high accuracy while preventing loads received by the load member from affecting the torque member.

In Japanese Unexamined Patent Application Publication No. 2011-209099, in the torque sensor embedded in the actuator, four engaging parts of four respective strain bodies are separated from engaging recessed portions of the outer ring with predetermined gaps therebetween. According to this structure, transmission of forces and torque other than the torque around the axis to be detected is interrupted and the detection accuracy is enhanced. However, there are limitations in the working accuracy of the engaging recessed portions of the outer ring, the working accuracy of the widths of the engaging parts of the strain bodies, and the working accuracy of the gaps between the engaging recessed portions and the engaging parts that are engaged with each other.

When the widths of the gaps are not equal to one another, four engaging parts do not contact the respective engaging recessed portions equally to transmit the torque and only one engaging part may contact the engaging recessed portion or three engaging parts may contact the respective engaging recessed portions depending on the magnitude of the torque. In this case, the states of deformation in all the four strain bodies are different from one another, which causes bridge imbalance of resistances of detection elements that detect torque. Therefore, it becomes extremely difficult to increase the accuracy for detecting the torque.

Further, the strain bodies are supported through a rotation-transmitting member and a speed reducer on a casing by first and second bearings and the outer ring is supported through another bearing on the casing. As described above, the strain bodies and the outer ring are supported on the casing through bearings different from each other, and it is possible that axial cores of the bearings may be deviated from each other. When the rotating axis of the input side (the speed reducer and the inner ring) of the torque sensor and the rotating axis of the output side (the outer ring and the output axis) thereof are deviated from each other, it is difficult to make the widths of the respective gaps between the engaging parts and the engaging recessed portions equal to one another, and it is possible that an uneven contact, in which only some of the four engaging parts contact the respective engaging recessed portions, may occur. Therefore, an even rotational torque is not given to the strain bodies (an even strain does not occur in the strain bodies), which causes degradation in the accuracy for detecting the torque.

SUMMARY

The present invention has been made in view of the aforementioned problems and aims to provide a technique capable of suppressing an uneven contact in a strain body and improving the accuracy for detection.

An actuator according to an embodiment includes: a first rotating body that is rotatable around an input axis and includes a first engaging part extending in a first direction; a second rotating body that is rotatable around an output axis and includes a second engaging part extending in a second direction substantially perpendicular to the first direction; a first bearing that supports the first rotating body on a casing;

a second bearing that supports the second rotating body on the casing; a strain body that includes a first engaged part capable of being engaged with the first engaging part through a gap whose direction is vertical to that of the input axis and a second engaged part capable of being engaged with the second engaging part through a gap whose direction is vertical to that of the output axis and transmits a rotational torque of the input axis to the output axis; and a detection element that is attached to the strain body and measures a strain of the strain body by the rotational torque.

In the aforementioned actuator, at least a part of a side surface of the first engaging part and a part of a side surface of the first engaged part that are opposed to each other around the input axis may be in surface contact with each other, and at least a part of a side surface of the second engaging part and a part of a side surface of the second engaged part that are opposed to each other around the output axis may be in surface contact with each other.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

First Embodiment

In the following description, with reference to the drawings, a first embodiment will be described. In the accompanying drawings, components that achieve the same effects are denoted by the same reference symbols. Note that the dimensions in the drawings do not reflect the actual dimensions. Further, for the sake of convenience of description, in each of the drawings, three axes (x-axis, y-axis, and z-axis) perpendicular to one another are shown.

This embodiment relates to an actuator that is embedded in articulations (e.g., hands, legs, and the neck) of an articulated robot, drives the robot, and includes a torque sensor therein. The robot may have any desired structure as long as the robot is able to perform a predetermined work.

Figure 1:
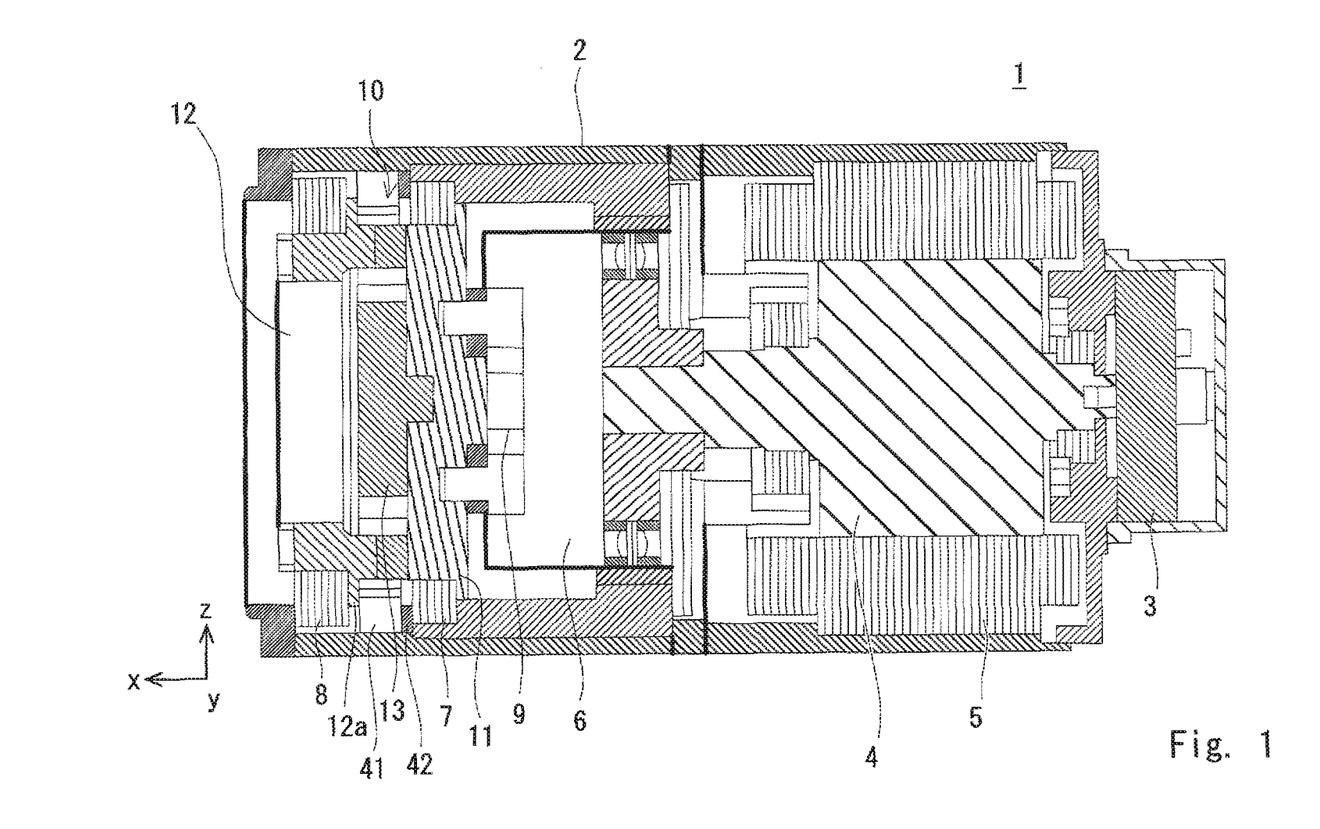
FIG. 1 is a cross-sectional view showing a structure of an actuator according to a first embodiment.

FIG. 1 is a cross-sectional view showing a structure of an actuator according to this embodiment. As shown in FIG. 1, an actuator 1 includes a casing 2, an encoder 3, a rotor 4, a stator 5, a speed reducer 6, a first bearing 7, a second bearing 8, and a torque sensor 10. The encoder 3, the rotor 4, the stator 5, the speed reducer 6, the first bearing 7, the second bearing 8, and the torque sensor 10 are accommodated in the casing 2.

The rotor 4 and the stator 5 constitute an electric motor. A typical three-phase AC synchronous motor (a DC brushless motor) may be used as a motor that includes the rotor 4 and the stator 5. The motor is controlled according to a control signal supplied from a controller (not shown). The rotor 4 is fixed to a motor shaft (driving shaft) that extends in the x-axis direction in the casing 2 and is integrally rotated therewith. The stator 5 includes a core, a coil and the like that are opposed to the rotor 4 and is attached inside the casing 2. The stator 5 generates a rotating magnetic field and rotationally drives the rotor 4.

The encoder 3 is connected to the motor shaft of the motor. The encoder 3 detects a rotational angle of the motor and supplies encoder information to the controller (not shown).

The torque sensor 10 detects a rotational torque that is generated when a rotational driving force is transmitted to an output axis and supplies the detection information to the controller (not shown). The motor is controlled using the encoder information and the detection information of the torque sensor 10. The torque sensor 10 will be described later in detail.

The speed reducer 6 is connected to the motor shaft of the motor. The speed reducer 6 reduces the rotational speed that has been input from the motor shaft at a predetermined reduction rate and generates the rotational driving force having a predetermined rotational torque. Various types of speed reducers may be used as the speed reducer 6. A wave gear speed reducer is, for example, used.

Figure 2:
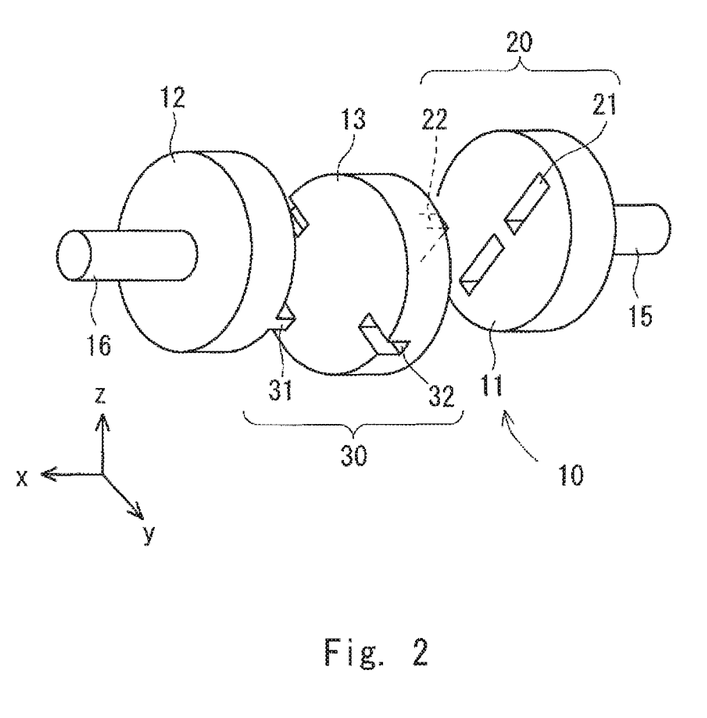
FIG. 2 is a perspective view showing a structure of a torque sensor according to the first embodiment.
Figure 3:
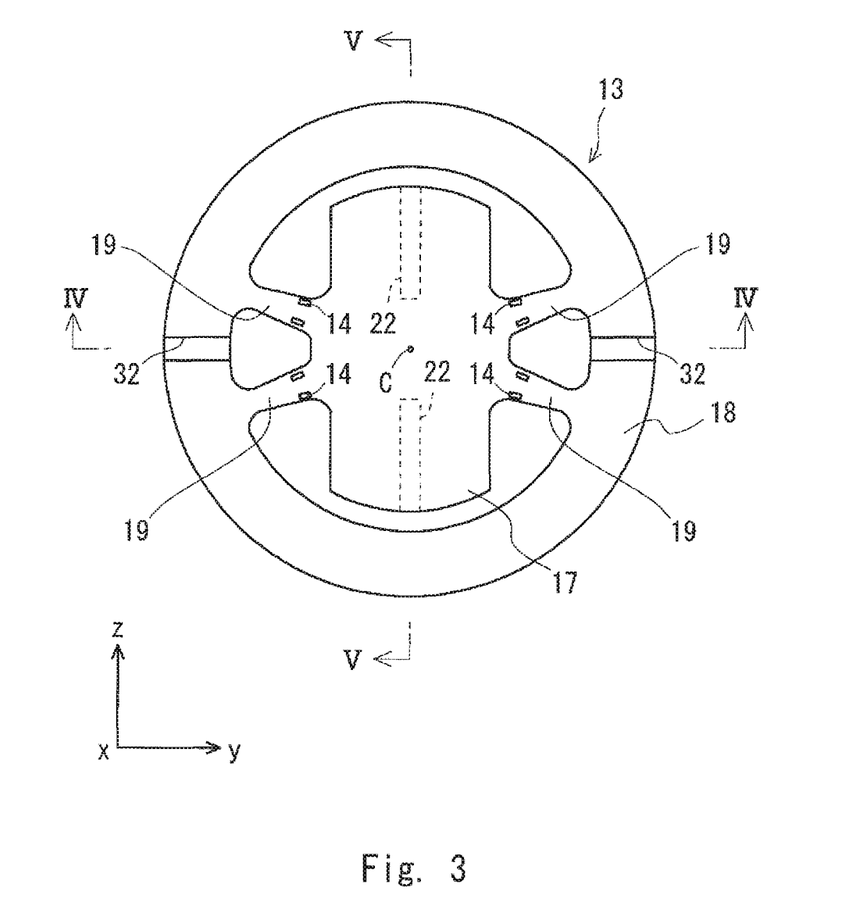
FIG. 3 is a diagram showing a structure of a strain body according to the first embodiment.
Figure 4:
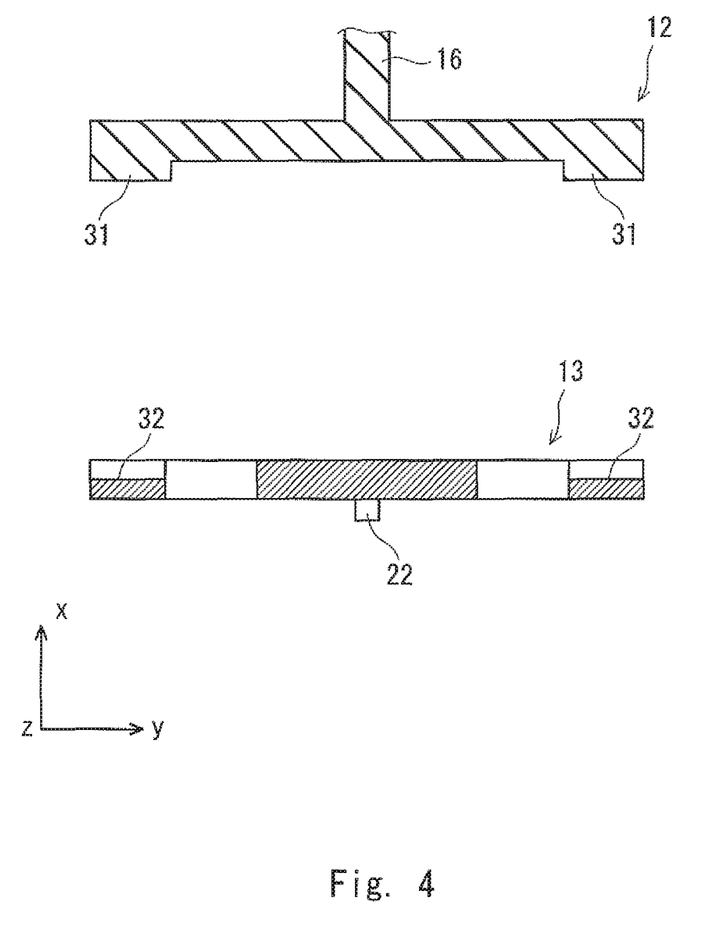
FIG. 4 is a cross-sectional view taken along the line IV-IV of FIG. 3.
Figure 5:
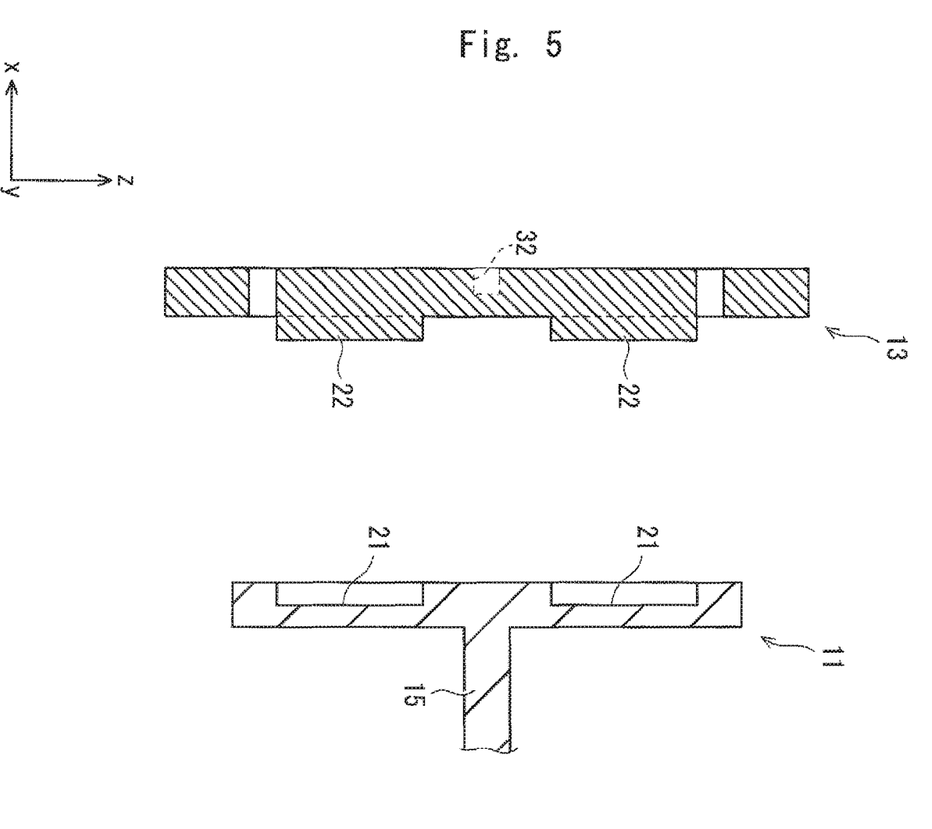
FIG. 5 is a cross-sectional view taken along the line V-V of FIG. 3.
Figure 6:
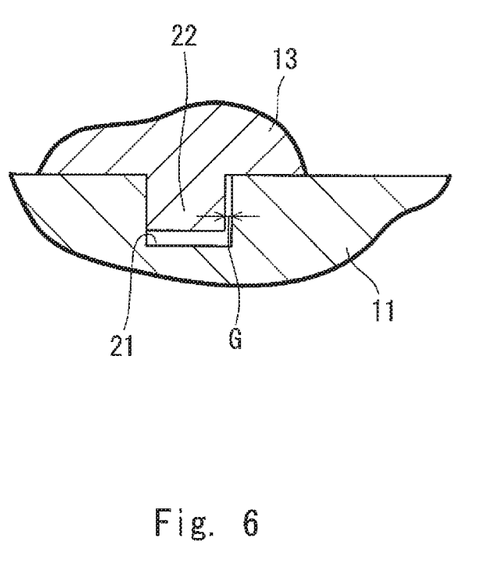
FIG. 6 is a cross-sectional view showing an engagement of a first groove part of a first rotating body with a first protruding part of a strain body according to the first embodiment.
Figure 7:
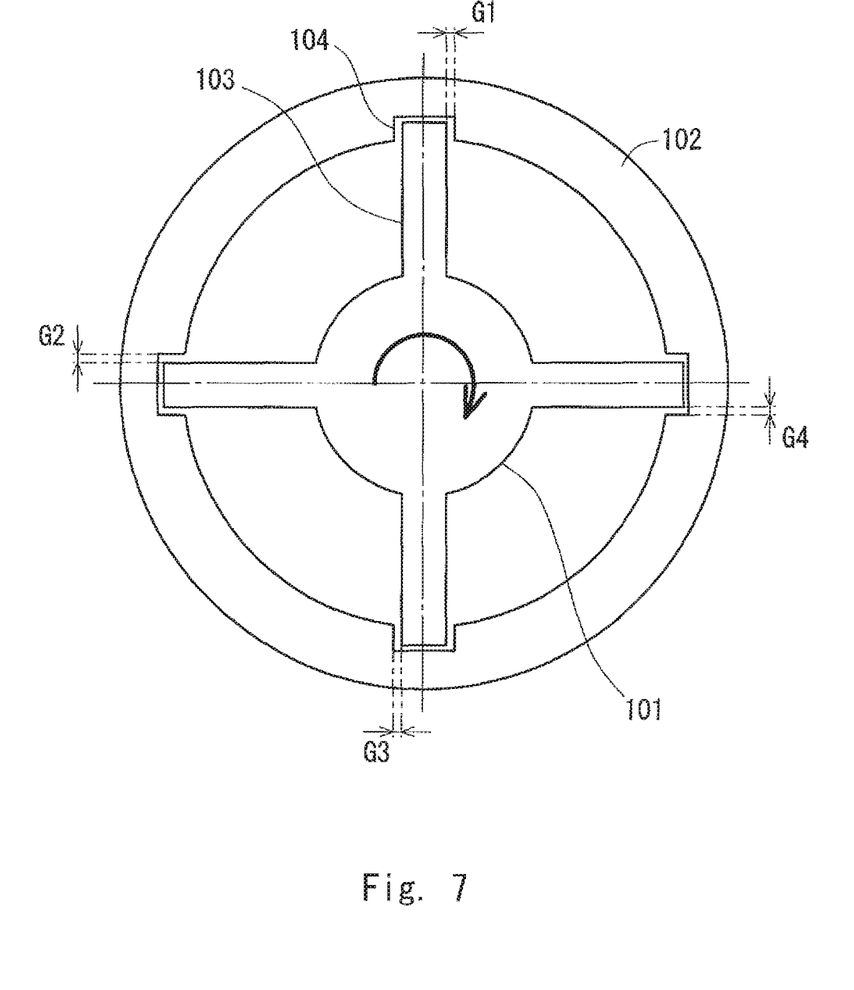
FIG. 7 is a diagram for describing a torque sensor according to a comparative example.

FIG. 2 is a perspective view showing a structure of the torque sensor 10 in FIG. 1. As shown in FIG. 2, the torque sensor 10 includes a first rotating body 11, a second rotating body 12, a strain body 13, detection elements 14 (FIG. 3), an input axis 15, and an output axis 16. In FIG. 2, the structure of the strain body 13 is shown in a simplified form. In FIG. 2, only first protruding parts 22 and second groove parts 32 of the strain body 13 are shown. FIG. 3 is a diagram showing the structure of the strain body 13 in detail. FIG. 4 is a cross-sectional view taken along the line IV-IV of FIG. 3 and FIG. 5 is a cross-sectional view taken along the line V-V of FIG. 3. FIG. 6 is a cross-sectional view showing an engagement of a first groove part of the first rotating body and the first protruding part of the strain body. FIGS. 2, 4, and 5 each show a state in which the strain body 13, the first rotating body 11, and the second rotating body 12 are not engaged with one another for the sake of convenience of the description.

The input axis 15 of the torque sensor 10 is formed coaxially to a speed reducer output axis 9 and is fastened by a screw (not shown) or the like, whereby the first rotating body 11 is fixed to the speed reducer output axis 9. The first rotating body 11 rotates with the input axis 15, the speed reducer output axis 9 serving as the input axis 15. The output axis 16 is formed coaxially to the input axis 15. The input axis 15 and the output axis 16 are rotating axes of the torque sensor 10.

The first rotating body 11 is a disc-shaped member. The upper surface and the lower surface of the first rotating body 11 are arranged in the direction vertical to the x axis, that is, in the direction parallel to the yz plane. The input axis 15 is connected to one surface of the first rotating body 11. First groove parts 21, which correspond to a "first engaging part", are provided on the other surface of the first rotating body 11. The first groove parts 21 are formed along the direction perpendicular to the rotating axis of the torque sensor. The shape of the cross section perpendicular to the longitudinal direction of the first groove parts 21 is a substantially rectangular shape. As shown in FIG. 5, a pair of first groove parts 21 are formed at the central part of the first rotating body 11 with the input axis 15 therebetween. The first rotating body 11 is rotated with the input axis 15 with respect to the casing 2 by the first bearing 7.

The second rotating body 12 is a disc-shaped member, similar to the first rotating body 11. The upper surface and the lower surface of the second rotating body 12 are arranged in the direction vertical to the x axis, that is, in the direction parallel to the yz plane. The output axis 16 is connected to one surface of the second rotating body 12. Second protruding parts 31, which correspond to a "second engaging part", are provided on the other surface of the second rotating body 12. The second protruding parts 31 are formed along the direction perpendicular to the rotating axis of the torque sensor. The shape of the cross section perpendicular to the longitudinal direction of the second protruding parts 31 is a substantially rectangular shape. As shown in FIG. 4, a pair of second protruding parts 31 are formed in the outer peripheral part of the second rotating body 12 with the output axis 16 therebetween. The second rotating body 12 rotates with the output axis 16 with respect to the casing 2 by the second bearing 8.

The strain body 13 is provided between the first rotating body 11 and the second rotating body 12. The strain body 13 is also a disc-shaped member, similar to the first rotating body 11 and the second rotating body 12. The materials of the first rotating body 11, the second rotating body 12, and the strain body 13 are not particularly limited and various structural materials made of an iron and steel material and a non-ferrous metal material may be used.

A material that is elastically deformed when it receives the rotational torque generated by the speed reducer 6 is, for example, used as the material of the strain body 13. A substance having a surface that is slippery when it is opposed to and contact the strain body 13 is suitably used as the first rotating body 11 and the second rotating body 12. A plated substance obtained by applying plating such as KANIFLON (registered trademark) may be used, for example, as the substance of the first rotating body 11 and the second rotating body 12. Preferably, the first rotating body 11 and the second rotating body 12 are not deformed.

With reference to FIG. 3, the strain body 13 will be described in detail. As shown in FIG. 3, the strain body 13 includes a first structure body 17, a second structure body 18, strain parts 19, the first protruding parts 22, and the second groove parts 32. As shown in FIGS. 2 and 5, the first protruding parts 22 capable of being engaged with the first groove parts 21 through gaps whose direction is vertical to that of the input axis 15 are provided on the surface of the strain body 13 that is opposed to the first rotating body 11. The first protruding parts 22 serve as a "first engaged part".

Further, as shown in FIGS. 2 and 4, the second groove parts 32 capable of being engaged with the second protruding parts 31 through gaps whose direction is vertical to that of the output axis 16 are provided on the surface of the strain body 13 that is opposed to the second rotating body 12. The second groove parts 32 serve as a "second engaged part".

The first groove parts 21 and the first protruding parts 22 constitute a first torque transmission mechanism 20 and the second protruding parts 31 and the second groove parts 32 constitute a second torque transmission mechanism 30. The torque sensor 10 transmits the rotational torque input from the speed reducer 6 to the input axis 15 to the output axis 16 via the first rotating body 11, the first torque transmission mechanism 20, the strain body 13, the second torque transmission mechanism 30, and the second rotating body 12.

The first protruding parts 22 are formed along a first direction that is perpendicular to the rotating axis of the torque sensor. The first protruding parts 22 are formed in the positions corresponding to the first groove parts 21 and a pair of first protruding parts 22 are formed in the central part of the strain body 13 with the input axis 15 being formed between the pair of the first protruding parts 22. The shape of the cross section perpendicular to the longitudinal direction of the first protruding parts 22 is a substantially rectangular shape. The first protruding parts 22 are formed to correspond to the shape of the first groove parts 21. That the first protruding parts 22 are accommodated in the first groove parts 21 means that the first structure body 17 is coupled to the first rotating body 11.

The second groove parts 32 are formed along a second direction that is perpendicular to the rotating axis of the torque sensor. The second groove parts 32 are formed in the positions corresponding to the second protruding parts 31 and a pair of second groove parts 32 are formed in the outer peripheral part of the strain body 13 with the output axis 16 being formed between the pair of second groove parts 32. The shape of the cross section perpendicular to the longitudinal direction of the second groove parts 32 is a substantially rectangular shape. The second groove parts 32 are formed to correspond to the shape of the second protruding parts 31. The second direction is perpendicular to the first direction. That is, the angle of the direction in which the first protruding parts 22 extend and the direction in which the second groove parts 32 extend is substantially 90 degrees. That the second protruding parts 31 are accommodated in the second groove parts 32 means that the second structure body 18 is coupled to the second rotating body 12.

The first protruding parts 22 are accommodated in the first groove parts 21. A predetermined gap is formed between the inner surface of the first groove part 21 and the outer surface of the first protruding part 22. That is, a gap is formed between the top surface of the first protruding parts 22 and the bottom surface of the first groove parts 21 in the direction vertical to the x axis. Further, as shown in FIG. 6, a gap G is formed between the side surface of the first protruding part 22 and the side surface of the first groove part 21 in the direction about the x axis (rotational direction).

The second protruding parts 31 are accommodated in the second groove parts 32. A predetermined gap is formed between the inner surface of the second groove part 32 and the outer surface of the second protruding part 31. That is, a gap is formed between the top surface of the second protruding part 31 and the bottom surface of the second groove part 32 in the direction vertical to the x axis. Further, a gap is formed between the side surface of the second protruding part 31 and the side surface of the second groove part 32 in the direction about the x axis (rotational direction).

As shown in FIG. 3, the strain parts 19 couple the first structure body 17 to the second structure body 18. In the example shown in FIG. 3, four strain parts 19 are provided at arbitrary intervals. The detection elements 14 are attached to the strain body 13. The detection elements 14 are thin-film strain sensors capable of detecting the amount of deformation of the strain parts 19. The detection elements 14 are patterned on each of the strain parts 19 by sputtering. The torque acting between the first structure body 17 and the second structure body 18 is calculated based on output values from the plurality of detection elements 14.

Prior to giving the description of the effects of the actuator 1 according to this embodiment, a torque sensor according to a comparative example will be described with reference to FIGS. 7 to 10. The comparative example shown in FIGS. 7 to 10 includes a torque sensor that has a structure in which it is divided into an inner ring 101 and an outer ring 102, as disclosed in Japanese Unexamined Patent Application Publication No. 2011-209099. Four strain bodies 103 are accommodated in four respective engaging recessed portions 104 formed in the outer ring 102 via gaps G1 to G4.

Figure 8:
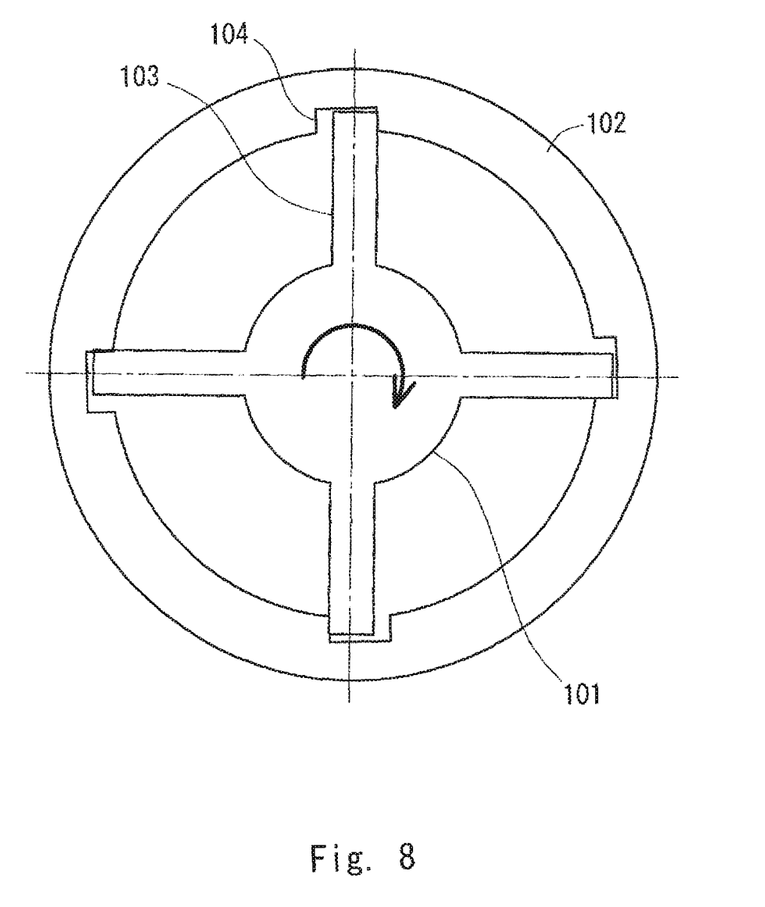
FIG. 8 is a diagram for describing the torque sensor according to the comparative example.

As shown in FIG. 8, only when the axes of the inner ring 101 and the outer ring 102 completely coincide with each other and the gaps G1 to G4 are completely equal to one another, do the four strain bodies 103 contact the side surfaces of the respective engaging recessed portions 104 at the same time and the bridge balance of resistances of the detection elements that detect the torque is maintained.

Figure 9:
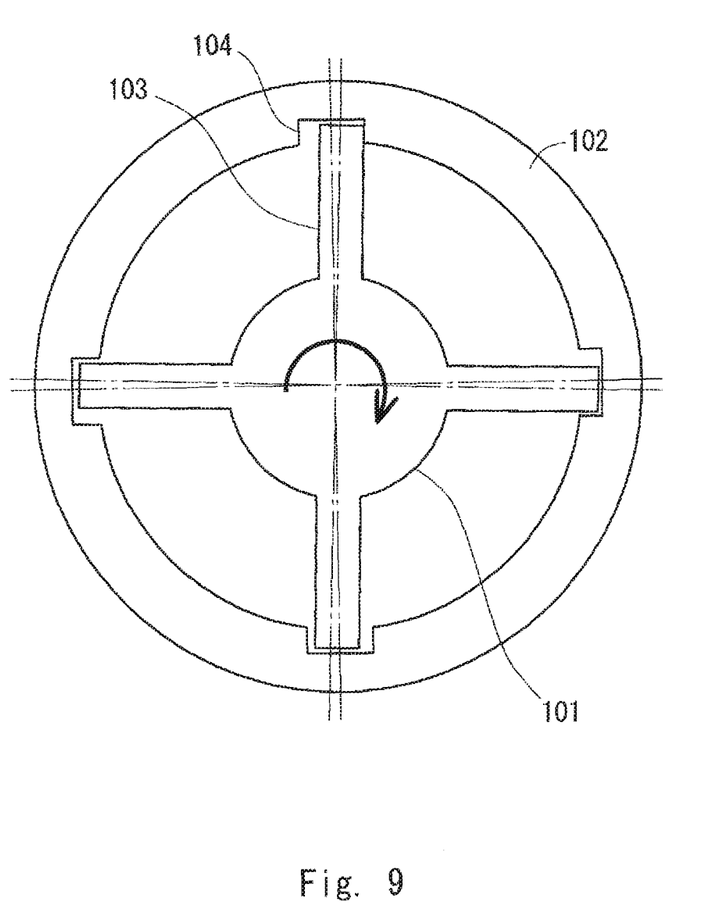
FIG. 9 is a diagram for describing the torque sensor according to the comparative example.
Figure 10:
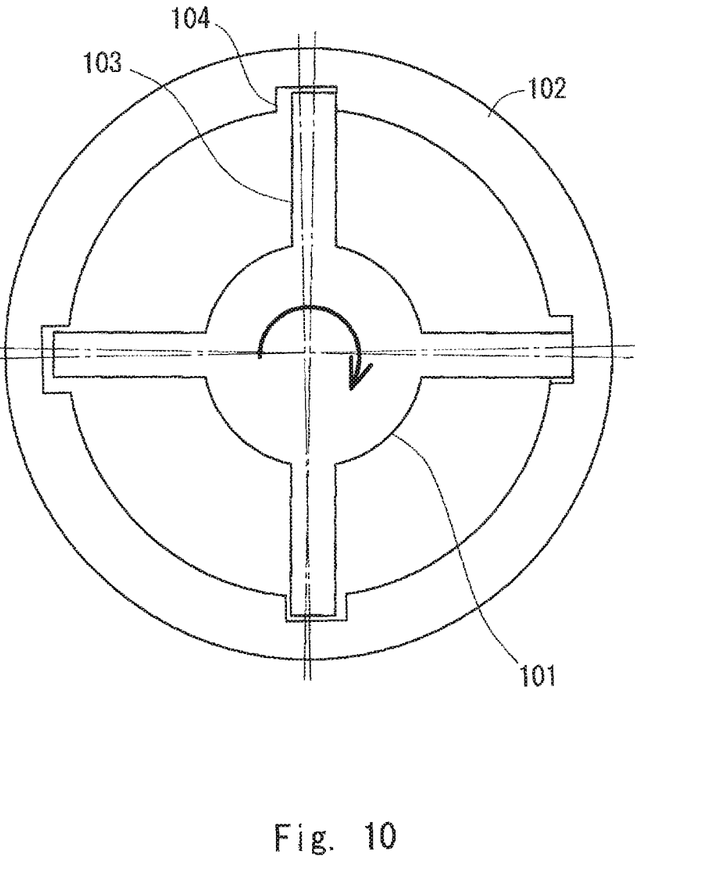
FIG. 10 is a diagram for describing the torque sensor according to the comparative example.

In reality, however, uneven contact, in which only some of the strain bodies 103 contact the respective engaging recessed portions 104, occurs due to the variations in the working accuracy. When the gaps G1 to G4 are different from one another even when the axis of the inner ring 101 and that of the outer ring 102 coincide with each other, the strain body 103 and the engaging recessed portion 104 contact each other only in the position where the gap is the smallest. As shown in FIG. 9, for example, only the strain body 103 on the upper side contacts the engaging recessed portion 104 while the three other strain bodies 103 do not contact the respective engaging recessed portions 104. Further, as shown in FIG. 10, even when the axes of the inner ring 101 and the outer ring 102 are deviated from each other, the strain body 103 contacts the engaging recessed portion 104 only in the position where the gap is the smallest.

As described above, when the uneven contact, in which only some of the four strain bodies 103 contact the respective engaging recessed portions 104, occurs, the deformation states of the four strain bodies are different from one another. Therefore, it becomes extremely difficult to increase the accuracy for detecting the torque.

Next, with reference to FIGS. 2 to 6, the effects of the torque sensor 10 according to this embodiment will be described. As described above, it is possible that the input axis and the output axis of the torque sensor may be deviated from each other depending on the element working accuracy or the assembling accuracy. Due to the deviation in the rotating axes (the input axis and the output axis), forces other than the torque (other axial forces) are applied to the detection elements of the torque sensor, which reduces the accuracy for detecting the torque. Further, the speed reducer typically includes vibration components in the axial direction (x-axis direction) and the radial direction (the direction vertical to the x axis) and forces in the axial direction and the radial direction from the speed reducer are applied to the input axis of the torque sensor. Further, other axial forces from the load link coupled to the output axis are applied to the input axis of the torque sensor. Therefore, the accuracy for detecting the torque is reduced for these reasons also.

Further, when the stiffness of the bearings (the first bearing 7 and the second bearing 8) that support the input side (the first rotating body 11) and the output side (the second rotating body 12) is increased, the friction force increases. Therefore, it is not practical to increase the stiffness of the bearings to such a degree that none of the other axial forces are transmitted to the torque sensor.

In this embodiment, the torque sensor 10 has a structure in which the first rotating body 11, the second rotating body 12, and the strain body 13 are divided from one another. The first protruding parts 22 are separated from the first groove parts 21 through gaps in the radial direction and the rotational direction. Further, the second protruding parts 31 are separated from the second groove parts 32 through gaps in the radial direction and the rotational direction. The size of the gaps between the first protruding parts 22 and the first groove parts 21 and the size of the gaps between the second protruding parts 31 and the second groove parts 32 are not particularly limited and may be set as appropriate.

Further, the direction in which the first protruding parts 22 (first engaged part) formed in the strain body 13 extend and the direction in which the second groove parts 32 (second engaged part) formed in the strain body 13 extend are substantially perpendicular to each other. The angle of the direction in which the first protruding parts 22 extend and the direction in which the second groove parts 32 extend is about 90 degrees. Therefore, the direction in which the first groove parts 21 (first engaging part) of the first rotating body 11 that accommodate the first protruding parts 22 extend and the direction in which the second protruding parts 31 (second engaging part) of the second rotating body 12 that are accommodated in the second groove parts 32 extend are substantially perpendicular to each other.

Since the torque sensor has a structure in which the first rotating body 11, the second rotating body 12, and the strain body 13 are separated from one another, the degree of freedom of the strain body 13 with respect to the direction in which the aforementioned gaps are formed is increased. Accordingly, it is possible to suppress application of axial forces other than the torque from the speed reducer 6 and other axial forces from the output axis 16 to the torque sensor 10, whereby it is possible to increase the accuracy for detecting the torque.

That is, the first protruding parts 22 are separated from the first groove parts 21 through gaps. Therefore, even when the rotating axis of the first rotating body 11 and that of the strain body 13 are deviated from each other, the strain body 13 is displaced vertically and horizontally, and the first groove parts 21 evenly contact the respective first protruding parts 22. Further, the second protruding parts 31 are separated from the second groove parts 32 through the gaps. Therefore, even when the rotating axis of the strain body 13 and that of the second rotating body 12 are deviated from each other, the strain body 13 is displaced vertically and horizontally, and the second protruding parts 31 evenly contact the respective second groove parts 32.

In this way, with respect to the input axis 15 and the output axis 16, the strain body 13 can be moved in a direction other than the rotational direction. As a result, only the rotational torque is applied to the strain body 13 and the bridge balance of the detection elements attached to the strain body 13 is maintained. It thus becomes possible to suppress the uneven contact in the strain body, interrupt the other axial forces, and improve the accuracy for detecting the rotational torque.

As described above, according to this embodiment, the torque sensor 10 has a structure in which the first rotating body 11, the second rotating body 12, and the strain body 13 are deviated from one another. Therefore, it is possible to eliminate the influences of the axial forces other than the rotational torque to be detected and to achieve torque detection with high accuracy.

Further, according to this embodiment, the strain body 13 engages with each of the first rotating body 11 and the second rotating body 12 through the gaps. Accordingly, even when there is a deviation of the rotating axes, it is possible to reduce the uneven contact of the engaging parts and to improve the accuracy for detecting the torque.

While the first groove parts 21 are formed in the first rotating body 11, the second protruding parts 31 are formed in the second rotating body 12, and the first protruding parts 22 and the second groove parts 32 are formed in the strain body 13 in the example shown in the drawings, the present invention is not limited to this example.

For example, the protruding parts may be formed in the first rotating body 11 and the groove parts may be formed in the second rotating body 12. In this case, the groove parts may be formed on the surface of the strain body 13 that is opposed to the first rotating body 11 and the protruding parts may be formed on the surface of the strain body 13 that is opposed to the second rotating body 12. Further, the protruding parts may be formed in each of the first rotating body 11 and the second rotating body 12. In this case, the groove parts are formed on the respective surfaces of the strain body 13. Further, the groove parts may be formed in each of the first rotating body 11 and the second rotating body 12. In this case, the protruding parts are formed on the respective surfaces of the strain body 13.

Second Embodiment

In the first embodiment, the shape of the cross section that is perpendicular to the longitudinal direction of the first protruding parts 22 is a substantially rectangular shape, the first groove parts 21 are formed to correspond to the shape of the first protruding parts 22, and the gap is formed between the side surface of the first protruding part 22 and the side surface of the first groove part 21 in the direction about the x axis. Further, in the first embodiment, the shape of the cross section that is perpendicular to the longitudinal direction of the second protruding parts 31 is a substantially rectangular shape, the second groove part 32 are formed to correspond to the shape of the second protruding part 31, and the gap is formed between the side surface of the second protruding part 31 and the side surface of the second groove part 32 in the direction about the x axis.

The actuator may have a structure capable of suppressing the looseness of the first rotating body 11, the strain body 13, and the second rotating body 12 around the x axis when the first rotating body 11, the strain body 13, and the second rotating body 12 are rotated.

In order to achieve the aforementioned structure, a first torque transmission mechanism according to this embodiment has a structure in which at least a part of the side surface of the first protruding part and a part of the side surface of the first groove part that are opposed to each other around the x axis are substantially in surface contact with each other. Further, a second torque transmission mechanism according to this embodiment has a structure in which at least a part of the side surface of the second protruding part and a part of the side surface of the second groove part that are opposed to each other around the x axis are substantially in surface contact with each other. Since the structure of the actuator according to this embodiment is substantially equal to that of the actuator 1 according to the first embodiment, overlapping descriptions will be omitted and the same components are denoted by the same reference symbols.

Figure 11:
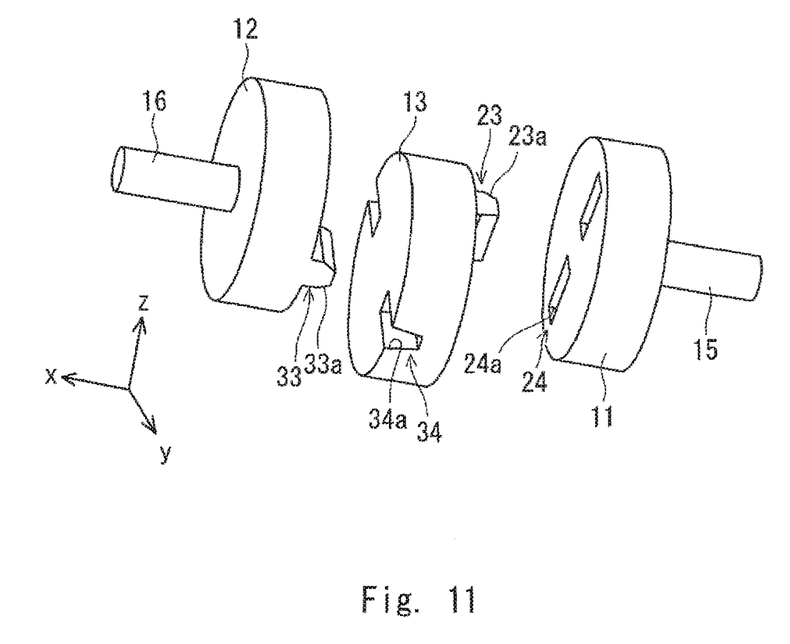
FIG. 11 is a perspective view showing a structure of a torque sensor according to a second embodiment.
Figure 12:
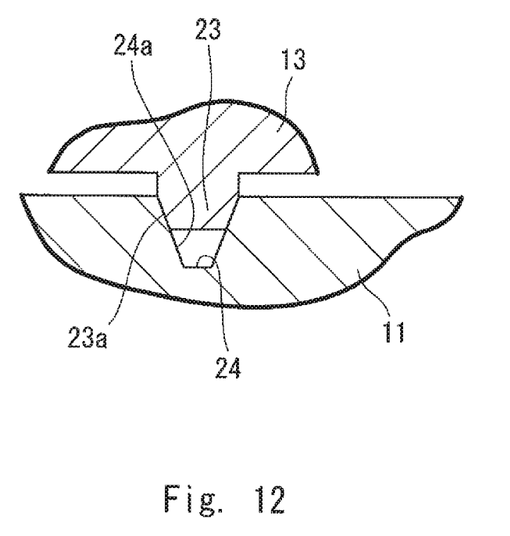
FIG. 12 is a cross-sectional view showing an engagement of a first groove part of a first rotating body with a first protruding part of a strain body according to the second embodiment.

As shown in FIG. 11, for example, the shape of the cross section that is perpendicular to the longitudinal direction in the end of a first protruding part 23 is formed to be a substantially trapezoidal shape. On the other hand, the shape of the cross section that is perpendicular to the longitudinal direction of a first groove part 24 is formed to be a substantially trapezoidal shape. As shown in FIG. 12, an inclined surface 23a of the first protruding part 23 and an inclined surface 24a of the first groove part 24 are substantially in surface contact with each other. That is, the first protruding part 23 and the first groove part 24 are engaged with each other with no gap therebetween about the x axis.

Further, as shown in FIG. 11, the shape of the cross section that is perpendicular to the longitudinal direction in the end of a second protruding part 33 is formed to be a substantially trapezoidal shape. On the other hand, the shape of the cross section that is perpendicular to the longitudinal direction of a second groove part 34 is formed to be a substantially trapezoidal shape. An inclined surface 33a of the second protruding part 33 and an inclined surface 34a of the second groove part 34 are substantially in surface contact with each other. That is, the second protruding part 33 and the second groove part 34 are engaged with each other with no gap therebetween about the x axis.

According to the aforementioned structure, it is possible to suppress the looseness of the first rotating body 11, the strain body 13, and the second rotating body 12 around the x axis when the torque sensor is rotated. It is therefore possible to improve the accuracy for detecting the torque sensor.

Furthermore, as described above, the end of the first protruding part 23 is formed to have a substantially trapezoidal shape, the first groove part 24 is formed to have a shape corresponding to the shape of the first protruding part 23, the end of the second protruding part 33 is formed to have a substantially trapezoidal shape, and the second groove part 34 is formed to have a shape corresponding to the shape of the second protruding part 33. Accordingly, by adjusting the amount of push-in of the strain body 13 in the x-axis direction by the second rotating body 12, it becomes possible to easily bring the inclined surface 23a of the first protruding part 23 and the inclined surface 24a of the first groove part 24, and the inclined surface 33a of the second protruding part 33 and the inclined surface 34a of the second groove part 34 into substantially surface contact with each other.

With reference to FIG. 1, for example, the second rotating body 12 includes a flange part 12a that projects outwardly from the outer peripheral surface of the second rotating body 12, and when the position of the second rotating body 12 in the x-axis direction depends on the thickness of a spacer 41 and that of a shim 42 arranged between the flange part 12a of the second rotating body 12 and the first bearing 7, it is possible to adjust the amount of push-in of the strain body 13 in the x-axis direction by the second rotating body 12 by adjusting the thickness of the spacer 41 and that of the shim 42. Since the flange part 12a of the second rotating body 12 is held between the second bearing 8 and the spacer 41, the position of the second rotating body 12 in the x-axis direction is fixed. Accordingly, by adjusting the thickness of the spacer 41 and that of the shim 42, it becomes possible to easily bring the inclined surface 23a of the first protruding part 23 and the inclined surface 24a of the first groove part 24, and the inclined surface 33a of the second protruding part 33 and the inclined surface 34a of the second groove part 34 into substantially surface contact with each other.

While the end of the first protruding part 23 and that of the second protruding part 33 of this embodiment are formed to have a substantially trapezoidal shape, the ends thereof may have any other shape as long as, in the state in which the rotating axes of the first rotating body 11, the strain body 13, and the second rotating body 12 are arranged on the x axis, the inclined surfaces are arranged in line symmetrical to each other about the axis extending in the radial direction when seen from the x-axis direction, and the gap between the inclined surfaces that are opposed to each other in the first protruding part 23 and the second protruding part 33 is gradually narrowed down in the axial direction. Further, it is sufficient that the first groove part 24 includes an inclined surface that is substantially in surface contact with the inclined surface of the first protruding part 23 and that the second groove part 34 includes an inclined surface that is substantially in surface contact with the inclined surface of the second protruding part 33.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An actuator comprising:
   a first rotating body that is rotatable around an input axis, and includes a first engaging part that is longitudinal in a first direction and that has a substantially trapezoidal part in at least a part of a shape of a cross section that is perpendicular to the first direction;
   a second rotating body that is rotatable around an output axis, and includes a second engaging part that is longitudinal in a second direction substantially perpendicular to the first direction and that has a substantially trapezoidal part in at least a part of a shape of a cross section that is perpendicular to the second direction;
   a first bearing that supports the first rotating body on a casing;
   a second bearing that supports the second rotating body on the casing;
   a strain body that comprises:
      a first engaged part capable of being engaged with the first engaging part through a gap whose direction is vertical to that of the input axis, that is longitudinal in the first direction and has a substantially trapezoidal part in at least a part of a shape of a cross section that is perpendicular to the first direction, and
      a second engaged part, capable of being engaged with the second engaging part through a gap whose direction is vertical to that of the output axis, that is longitudinal in the second direction, has a substantially trapezoidal part in at least a part of a shape of a cross section that is perpendicular to the second direction, and transmits a rotational torque of the input axis to the output axis; and
   a detection element that is attached to the strain body and measures a strain of the strain body by the rotational torque,
   wherein a side surface of the substantially trapezoidal part of the first engaging part and a side surface of the substantially trapezoidal part of the first engaged part that are opposed to each other around the input axis are in surface contact with each other, and
   wherein a side surface of the substantially trapezoidal part of the second engaging part and a side surface of the substantially trapezoidal part of the second engaged part that are opposed to each other around the output axis are in surface contact with each other.

* * * * *